United States Patent [19]

Andermo

[11] Patent Number: 4,959,615
[45] Date of Patent: Sep. 25, 1990

[54] ELECTRODE STRUCTURE FOR CAPACITANCE-TYPE MEASUREMENT TRANSDUCERS

[75] Inventor: Nils I. Andermo, Kirkland, Wash.

[73] Assignee: Micro Encoder, Inc., Kirkland, Wash.

[21] Appl. No.: 359,699

[22] Filed: May 31, 1989

Related U.S. Application Data

[63] Continuation-in-part of Ser. No. 200,368, May 31, 1988, Pat. No. 4,879,508, which is a continuation-in-part of Ser. No. 30,346, Mar. 26, 1987, abandoned, and a continuation-in-part of Ser. No. 31,049, Mar. 26, 1987, abandoned, and a continuation-in-part of Ser. No. 35,859, Apr. 8, 1987, abandoned.

[51] Int. Cl.$^5$ ............................................. G01R 27/26
[52] U.S. Cl. .................................... 324/690; 324/660; 340/870.37; 341/15
[58] Field of Search ................. 324/61 R, 61 P, 60 R, 324/60 C, 660, 658, 690; 340/870.37; 341/15; 33/706, 789

[56] References Cited

U.S. PATENT DOCUMENTS

| | | | |
|---|---|---|---|
| 3,860,918 | 1/1975 | Cencel | 324/61 R X |
| 4,177,421 | 12/1979 | Thornburg | 324/61 R |
| 4,303,919 | 12/1981 | Dimeff | 324/61 R X |
| 4,410,852 | 10/1983 | Guretzky | 340/870.37 X |
| 4,434,391 | 2/1984 | Swartz et al. | 340/870.37 X |
| 4,733,235 | 3/1988 | Baer et al. | 324/61 P X |

Primary Examiner—Reinhard J. Eisenzopf
Assistant Examiner—Robert W. Mueller
Attorney, Agent, or Firm—Oliff & Berridge

[57] ABSTRACT

A capacitance-type measuring apparatus includes first and second support members which are movable with respect to one another along a measurement axis; a first electrode array and a second electrode disposed on the first support member; and a third electrode array disposed on the second support member and capacitively coupling the first electrode array and second electrode for transmission of a signal between the first electrode array and second electrode through the third electrode array. One of the first electrode array or the second electrode is formed to have end portions configured such that the degree of coupling between the first electrode array and second electrode through the third electrode array decreases linearly along the extent of each end portion relative to the measurement axis. This configuration permits improved measurement accuracies by reducing the effects of tilt between the first and second support members which changes the spacing between such members along the axis of measurement.

40 Claims, 6 Drawing Sheets

ELECTRODE STRUCTURE FOR CAPACITANCE-TYPE MEASUREMENT TRANSDUCERS

CROSS-REFERENCE TO RELATED APPLICATIONS

The present application is a continuation-in-part application of copending U.S. application Ser. No. 07/200,368 filed May 31, 1988, now U.S. Pat. No. 4,879,508, which in turn is a continuation-in-part of U.S. application Ser. Nos. 07/030,346 and 07/031,049, both filed Mar. 26, 1987, and Ser. No. 07/035,859, filed Apr. 8, 1987 all of which are now abandoned.

FIELD OF THE INVENTION

The present invention relates generally to measuring devices for making linear and angular measurements, and more particularly to a capacitance-type measuring transducer with an improved electrode configuration for making measurements of position.

BACKGROUND OF THE INVENTION

Numerous capacitance-type measuring devices for making linear and angular measurements have been developed wherein two support members or scales, on which are respectively mounted arrays of discrete, capacitively coupled electrodes, are displaced relative to one another, and the relative positions of the two scales are determined by sensing the resulting change in the capacitance pattern created by the arrays of electrodes. Typically, the capacitance pattern is sensed by applying a plurality of periodic signals to one of the electrode arrays and measuring the shift in signals resulting from the transfer to the other array of electrodes. Such measuring devices have a broad range of applications, from large-scale measuring devices such as three-dimensional coordinate measuring systems and numerically controlled finishing machines, to small-scale devices such as portable calipers, micrometers and the like.

In addition to the increasing popularity of the capacitance-type measuring devices, a wide variety of configurations and designs have been proposed which implement both relative and absolute measurements. While various improvements have been made to increase the capabilities of such capacitance-type measuring devices, there are still disadvantages which limit the accuracy with which measurements can be made or increase the cost of constructing the measuring devices in order to compensate for the accuracies. In particular, many applications require the ability to obtain low-cost accurate measurements even when the devices will be subjected to hostile conditions in the environments in which they are used. As a result, if the devices are extremely sensitive during use, then their use will be limited by the ability to control the application environment or the need to obtain accuracy by expensive designs or manufacturing techniques.

More specifically, in the use of capacitance-type measuring devices of the type described having two scales relatively movable with respect to one another, the gap between the scales should be uniform over the entire area of overlap. Experience and theoretical calculations show that parallelism in the x/y-plane is the most important factor affecting accuracy. This sensitivity to tilt (i.e., rotation of one scale relative to the other around an axis perpendicular to the intended measurement direction in the plane of the scales) limits the achievable accuracy at a given mechanical tolerance in the suspension system guiding the movement of the two scales relative to each other. Or, for a given accuracy specification, it may require a tolerance level on the mechanical design that is not practical or is too expensive to implement.

The present invention, therefore, has been developed to overcome the specific shortcomings in the implementation of capacitance-type measuring devices and to provide an electrode configuration which improves measurement accuracy.

SUMMARY OF THE INVENTION

In accordance with one embodiment of the present invention, a transducer comprises first and second support members, the support members being relatively displaceable with respect to each other and relative to a measurement axis; first electrode structure disposed on the first support member and second electrode structure disposed on the second support member and capacitively coupled to the first electrode structure; the first and second electrode structures each having an elongate configuration relative to the measurement axis, and one of the first and second electrode structures having at least one end portion configured such that the degree of coupling between the first and second electrode structures decreases linearly relative to the measurement axis along the extent of each end portion.

In accordance with another embodiment of the present invention, the transducer includes first and second electrode structures disposed on the first support member; a third electrode structure disposed on the second support member and capacitively coupled to the first and second electrode structures for transmission of a signal between the first and second electrode structures through the third electrode structure; and the first and second electrode electrode structures are constructed to each have an elongate configuration relative to the measurement axis and such that one of the first and second electrode structures has at least one end portion configured such that the degree of coupling between the first and second electrode structures through the third electrode structure decreases linearly relative to the measurement axis along the extent of each end portion.

Advantageously, the transducer comprises an array of first electrodes disposed on the first support member in alignment with the measurement axis; an array of third electrodes disposed on the second support member in alignment with the measurement axis and such that different portions of the third electrode array are capacitively coupled with the first electrode array in dependence on the relative positions of the supporting members; and a second electrode disposed on the first support member in relative alignment with the first electrode array and capacitively coupled with the third electrode array in dependence on the relative position of the supporting members, one of the first electrode array and the second electrode being constructed to have the at least one end portion.

In accordance with a further aspect of the present invention, the first electrodes are arranged so as to constitute successive groups of a predetermined number of adjacent electrodes, the groups each having a wavelength Lt; and the second electrode has a length which is less than the length of the first electrode array and is substantially equal to an integer number of wavelengths Lt. Advantageously, the second electrode is configured so that the opposite ends thereof terminate in a tapered configuration. The second electrode is also advantageously configured so that the effective width of each end portion tapers from a full width to terminate at the respective ends of the electrode over a distance that is substantially equal to an integer number of wavelengths Lt.

In accordance with a further aspect of the present invention, the array of first electrodes is formed to define an envelope having an elongate configuration with a length which is less than the length of the second electrode and substantially equal to an integer number of wavelengths Lt. The first electrode array envelope advantageously further includes end portions in each of which the lengths and/or the widths of the individual electrodes progressively taper from a full length/width to termination at the respective ends of the array over a distance substantially equal to an integer number of wavelengths Lt.

These and other novel features and advantages of the present invention are described in or will become apparent from the following detailed description of preferred embodiments.

BRIEF DESCRIPTION OF THE DRAWINGS

The preferred embodiments will be described with reference to the drawing, wherein like elements have been denoted throughout the figures with like reference numerals, and wherein.

DETAILED DESCRIPTION OF THE PREFERRED EMBODIMENTS

Figure 1:
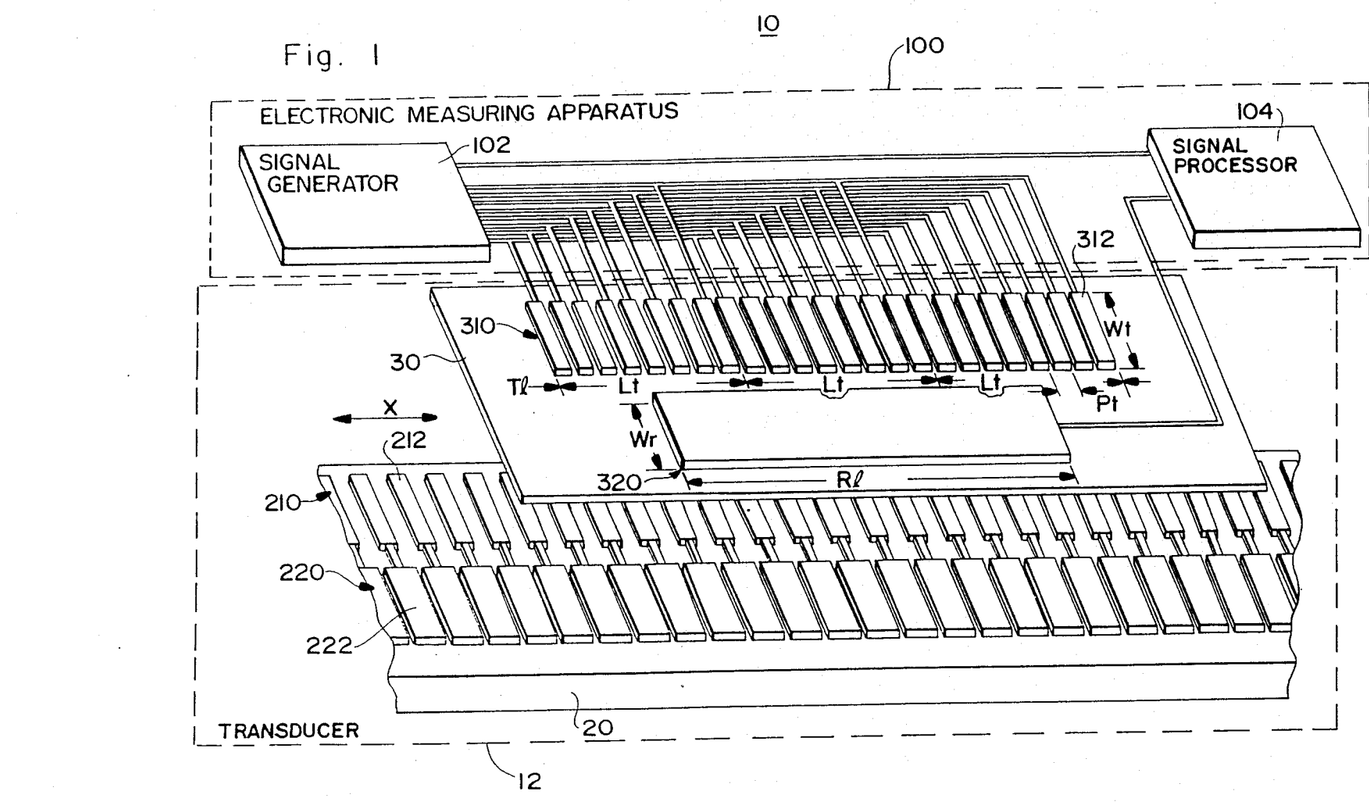
FIG. 1 is a partly schematic, partly diagrammatic view of a capacitance-type measuring device.

The present invention will be described in connection with its application to a linear measurement device. It will be understood, however, that the present invention is not limited to such measuring devices and may be implemented in a broad range of other devices for making a variety of measurements. Referring first to FIG. 1, there is shown a capacitance-type linear measurement caliper 10. The construction and configuration of the caliper 10 may be any of a variety of forms, several examples of which are described more fully in applicant's copending U.S. patent applications Ser. Nos. 07/200,368 and 07/200,580, both filed May 31, 1988, and herein incorporated by reference in their entirety.

Briefly, the caliper 10 includes a capacitive transducer 12 and electronic measuring apparatus 100 comprising a signal generator 102 and signal processor 104 for applying electrical excitation signals to transducer 12 and processing the resultant output signals produced by transducer 12 to ascertain a given measurement position. Transducer 12 comprises a linear first scale or support member 20, and a shorter linear second scale or support member 30, slidably mounted with respect to member 20 for longitudinal axial displacement along a predetermined measurement axis X. Support member 30 is generally known as the pick-off member and each of the members 20 and 30 are generally provided with extending caliper arms (not shown) which are used to permit measurements of the dimensions of an object.

The support members 20 and 30 each have a planar face on which are disposed various electrode arrangements, or structures 210, 220 and 310, 320, respectively, as will be more fully described below. Support members 20 and 30 are spaced in opposed, parallel relation to one another and slidably supported so that the support member 30 may be displaced longitudinally along the measurement axis with respect to the member 20. By way of example, the distance d separating the support members 20 and 30 is advantageously on the order of 0.05 mm (0.002 inch).

As described below and more particularly in the aforementioned copending applications, the electrode structures 310 and 320 are disposed adjacent one another on support 30 in relative alignment with the measurement axis X. Likewise, electrode structures 210 and 220 are electrically connected and disposed adjacent to one another on support member 20 in relative alignment with the measurement axis. As shown, the excitation signal outputs of signal generator 102 are connected to the electrodes of structure 310 and signal processor 104 is connected to electrode structure 320 to receive the output of transducer 12. Accordingly, for convenience of description, the electrodes of structure 310 (hereinafter array 310) will be described as first transmitter electrodes, the electrodes of structure 210 (hereinafter array 210) will be described as first receiver electrodes, the electrodes of structure 220 (hereinafter array 220) will be described as second transmitter electrodes, and the electrode structure 320 will be described as a second receiver or detector electrode. It will be appreciated, though, that the ability of transducer 12 to produce signals indicative of position is not dependent on the direction of signal transmission through the transducer. Thus, an excitation signal could be applied to electrode 320, making that electrode a transmitter electrode, and transducer outputs could be obtained from electrode array 310, making those electrodes receiver electrodes. (Arrays 220 and 210 would then be first receiver and second transmitter arrays, respectively.) Further, it will be appreciated that electrode arrays 210 and 220 can be considered functionally as a single array structure capacitively coupling array 310 and electrode 320. Still further, it will be appreciated that electrode 320 also can comprise an array of electrodes, as shown in applicant's aforementioned copending application Ser. No. 07/200,368. As depicted in FIG. 1, the electrode array 310 and electrode 320 are disposed on support 30 so as to be in opposed spaced relationship to electrodes 210 and 220, respectively, during relative movement of the support members 20 and 30 along the measurement axis.

In the embodiment shown, the first transmitter electrodes 310 are formed as a plurality of identical rectangular electrodes uniformly spaced adjacent to one another at predetermined intervals with a pitch Pt to form a rectangular envelope having a width Wt and a length Tl extending in the direction of the measurement axis X. As shown, successive series of a predetermined number greater than 1 (e.g., eight as shown) of adjacent electrodes 312 are respectively connected to a corresponding series of different excitation or input signals, and each series of electrodes constitutes a group spanning a distance defining one transmitter wavelength Lt. The detector electrode 320 has a generally elongate configuration in the form of a rectangle having a width Wr and a length Rl disposed adjacent and parallel to the first transmitter electrodes 310 and also extending in the direction of the measurement axis X.

First receiver electrode array 210 comprises a plurality of individual rectangular electrodes 212 uniformly spaced adjacent to one another on the support 20 in the direction of the measurement axis X. Second transmitter electrode array 220 likewise comprises a plurality of individual rectangular electrode elements 222 spaced adjacent to one another in the direction of measurement axis X. Each of the individual electrodes 222 of the second transmitter electrode array 220 are electrically coupled to corresponding individual electrodes 212 of the first receiver electrode array 210. First transmitter electrodes 312 and first receiver electrodes 212 are disposed on the supports 20 and 30, respectively, so that they maintain an opposed, spaced relationship during relative movement of the supports 20 and 30 along the measurement axis. Likewise, the detector electrode 320 and second transmitter electrodes 222 are disposed on supports 30 and 20, respectively, so as to maintain an opposed, spaced relationship during movement of the supports 20 and 30 along the measurement axis.

As is more particularly described in the aforementioned copending applications, periodically varying excitation signals are applied to the respective groups of first transmitter electrodes 310 by signal generator 102. Signals from the first transmitter electrodes 312 are capacitively coupled to the first receiver electrodes 212 and electrically coupled to the second transmitter electrodes 222. The signals are then transmitted by capacitive coupling to the detector electrode 320, which produces an output signal that is detected by the signal processor 104. The signal processor 104 then provides an indication of position by sensing the relationship between the signals transmitted by first transmitter electrodes 312 and the signals received by detector electrode 320.

Figure 2A:
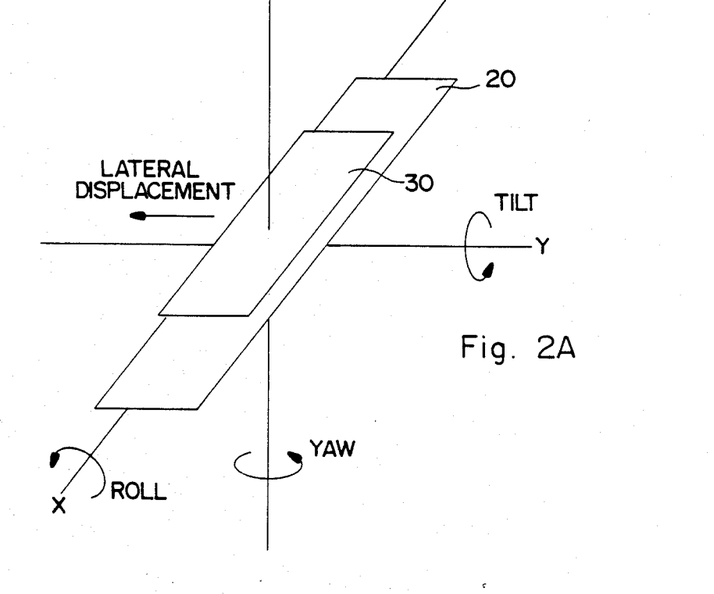
FIG. 2A is a diagrammatic view showing the possible axis of movement of two support members in a capacitance-type measuring device positioned in a three-dimensional coordinate system.

As was previously mentioned, in capacitance-type measuring devices of the type described, movement of the members 20 and 30 with respect to one another in directions other than the direction of measurement can have significant effects on the accuracy of the measurement. More particularly, there is shown in FIG. 2A a diagrammatic representation of the support members 20 and 30 disposed in a three-dimensional coordinate system. The coordinate system is defined by three axes, X, Y and Z, intersecting one another so that each axis is orthogonal to the other. The support members 20 and 30 are shown disposed in opposed relationship to one another in planes which are parallel to one another and to the plane formed by the X and Y axis. Furthermore, the members 20 and 30 are disposed to depict relative movement of the members in a direction along the measurement axis X.

Figure 2B:
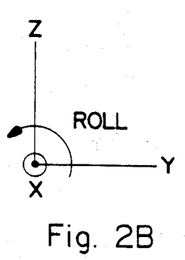
FIGS. 2B–2F are more detailed schematic depictions of the relative movements shown in FIG. 2A.
Figure 2C:
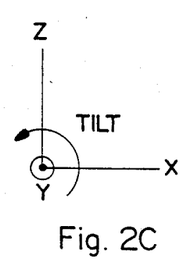
Figure 2D:
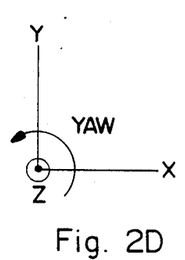
Figure 2E:
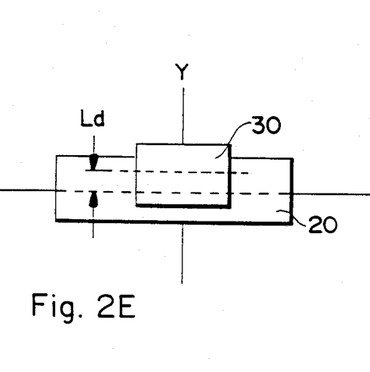

As will be appreciated, measurement inaccuracies can be caused by movement of the support members 20 and 30 and their associated electrodes with respect to one another in directions other than along the measurement axis. Such movements may occur as a result of the mechanical tolerances of the parts which mount and guide the movement of the individual members 20 and 30 with respect to one another in the caliper instrument. Such movements may also be characterized as four alignment parameters, which can be identified as roll, tilt, yaw and lateral offset, as more particularly shown in FIGS. 2B-2E, respectively. More specifically, movement of either of the members 20 and 30 about the X axis, as depicted in FIG. 2B, is identified as roll; movement of the support members 20 and 30 about the Y-axis, as depicted in FIG. 2C, is identified as tilt; movement of the support members 20 and 30 about the Z-axis, as depicted in FIG. 2D, is identified as yaw; and movement of the elements 20 and 30 with respect to one another along the Y-axis, as depicted in FIG. 2E, is identified as lateral offset (Ld) of displacement.

In a capacitance-type measuring device, each of the four alignment parameters identified as yaw, roll, tilt and lateral offset Ld can have an effect on the accuracy of the measurement. Each of such movements are in direction other than the measurement direction and each will influence the accuracy of measurement depending upon the degree of movement. It is therefore apparent that capacitance-type measuring devices manufactured with large mechanical tolerances in the structure that maintains the relative positions of the support members 20 and 30 and guides their relative movement, may lead to inaccurate measurements. Likewise, tightening of such tolerances will result in a more expensive manufacturing construction, and therefore higher costs for the measuring device.

In capacitance-type measuring devices of the type described, the effects of yaw, roll and lateral offset have been lessened by a variety of techniques. More particularly, any sensitivity to yaw and lateral offset can be reduced by sufficient overlap between the electrode arrays on the members 20 and 30. Furthermore, roll does not appear to influence the balance between the various signals coupled between the first transmitter electrodes and detector electrode by way of the first receiver electrodes and second transmitter electrodes. However, the effect of tilt produces significant measurement inaccuracies in instruments with large mechanical tolerances.

Figure 2F:
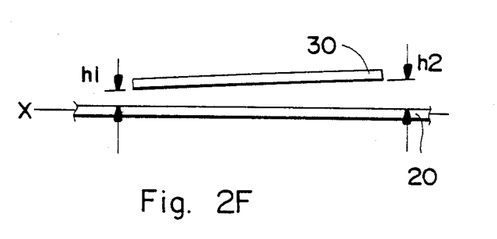

By way of example, the effect of tilt on various designs can be more clearly understood by reference to FIG. 2F, which shows the variation of the gap or spacing d between the elements 20 and 30 along the length of a measurement axis to produce spacing h1 at one end and spacing h2 at the opposite end. In order to illustrate the effect of the variable spacing caused by tilt, assume a nominal gap of 50 microns in FIG. 2F between the two members 20 and 30 and a tilt of one micron per mm length of the member 30. For a 40 mm long support 30, the spacing h1 would be 30 microns at one end and the spacing h2 would be 70 microns at the other end.

In one example using an embodiment of the capacitance-type device described in U.S. Pat. No. 4,420,754 having a scale wavelength of 2.54 mm, 4 transmitter phases, a 0.635 mm transmitter electrode pitch, and a 2.54 mm transmitter electrode wavelength, the resulting error for the specified tilt will vary over the wavelength of the scale 20 and have a peak-to-peak amplitude error of about 140 microns. This is an unacceptable error for a device like an electronic caliper with a resolution of 10 microns. In order to keep the error because of tilt down to half the resolution (i.e., equal to 5 microns), the mechanical tolerances in the guiding system controlling the location of the two scales relative to each other would need to be improved to be not more than 0.025 micron/mm, i.e., a 1 micron gap difference along the 40 mm extent of the scale 30.

In a second example using an embodiment of the capacitance-type measuring device described in applicant's aforementioned application Ser. No. 07/200,580 having transmitter electrodes distributed over five scale wavelengths and having a scale wavelength of 0.256 mm, eight transmitter phases, a transmitter electrode pitch of 0.160 mm and a transmitter wavelength of 1.28 mm, the error for the given value of tilt would again vary over the wavelength of the scale 20 with a peak-to-peak amplitude of about 2.5 microns. This is a much smaller error because of the shorter wavelength and the different sequence in which the phases are connected. (The phase sequence is described in applicant's aforementioned application Ser. No. 07/200,368.) But there are new uses for this capacitive sensor that require a resolution/accuracy of 1 micron, with the potential need for further improvement to 0.1 micron. In those cases, the 2.5 micron error is unacceptable. In both examples, the length of the support member 30 will have only a marginal influence on the error magnitude for a given tilt angle.

In accordance with the present invention, it has been determined that the effects of tilt can be significantly reduced by modifying the geometry of the electrodes disposed on support member 30. In particular, by modifying the geometry of the end portions of transmitter electrode array 310 or the detector electrode 320 such that the degree of coupling between the first transmitter electrode array and the detector electrode through the first receiver and second transmitter electrode arrays linearly decreases relative to the measurement axis along the extent of each end portion, as described in more detail hereinafter, the error caused by tilt can be very considerably improved. Specifically, in the first example above, the error induced by tilt will be reduced by a factor of 50, to 2.8 micron. In the second example above, the error will be reduced by a factor of 200, to the very small value of 0.01 micron. This allows capacitance-type devices to be constructed with less mechanical tolerances and thereby enables the production of less expensive devices while maintaining an improved level of accuracy.

Figure 3:
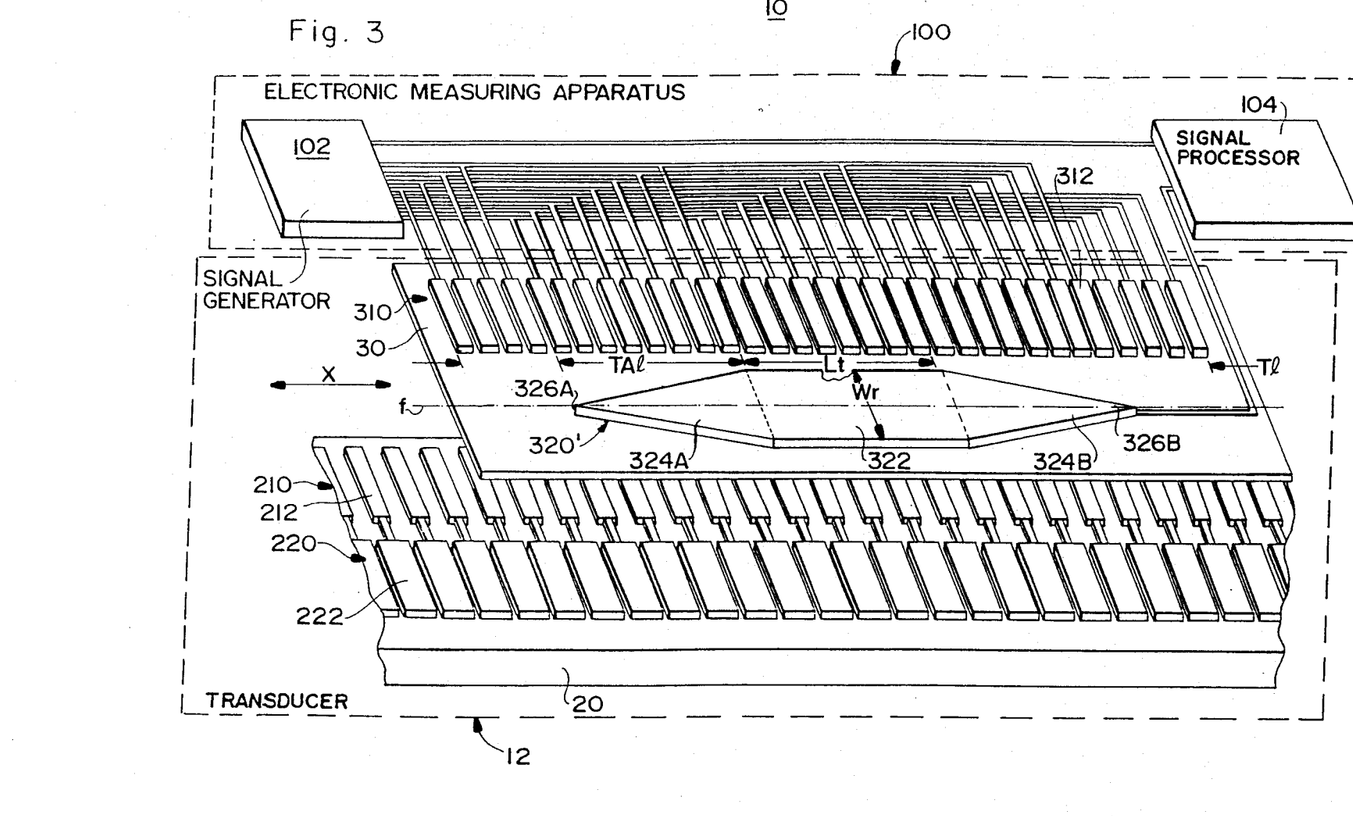
FIG. 3 is a diagrammatic view of a capacitance-type measuring device including a first embodiment of a transducer incorporating a tapered electrode structure in accordance with the present invention.

Referring particularly to FIG. 3, the same general caliper construction as shown in FIG. 1 is depicted. In the embodiment of the invention illustrated in FIG. 3, however, the detector electrode 320' is constructed to have an elongate configuration in the form of a rectangle terminated at each end by a tapered portion. More specifically, detector electrode 320' generally includes three portions, identified as a rectangular intermediate portion 322 and triangular terminal portions 324A and 324B extending from opposite ends of portion 322 to form a tapered electrode configuration in which the effective width of the electrode tapers linearly relative to the measurement axis from the full width Wr of the portion 322 to termination at each of the respective ends 326A and 326B over a distance TA1.

Advantageously, the triangular portions 324A and 324B are configured as equilateral triangles which form a symmetrical taper about the electrode center axis f over the distance TA1. In this embodiment, the electrodes 312 of the first transmitter electrode array 310 form an envelope of generally rectangular configuration of length T1, and the plurality of N electrodes 312 forming an electrode group span a distance of one transmitter wavelength Lt. The detector electrode 320' is configured as an elongate electrode having a length R1 (end to end) which is less than the length T1 of the envelope of the first transmitter electrodes 310. Furthermore, the detector electrode 320' is advantageously constructed so that the length TA1 of the tapered portions 324A and 324B is equal to one transmitter wavelength Lt, and the length R1 of the detector electrode 320' is equal to an integer number of transmitter wavelengths Lt.

Figure 4:
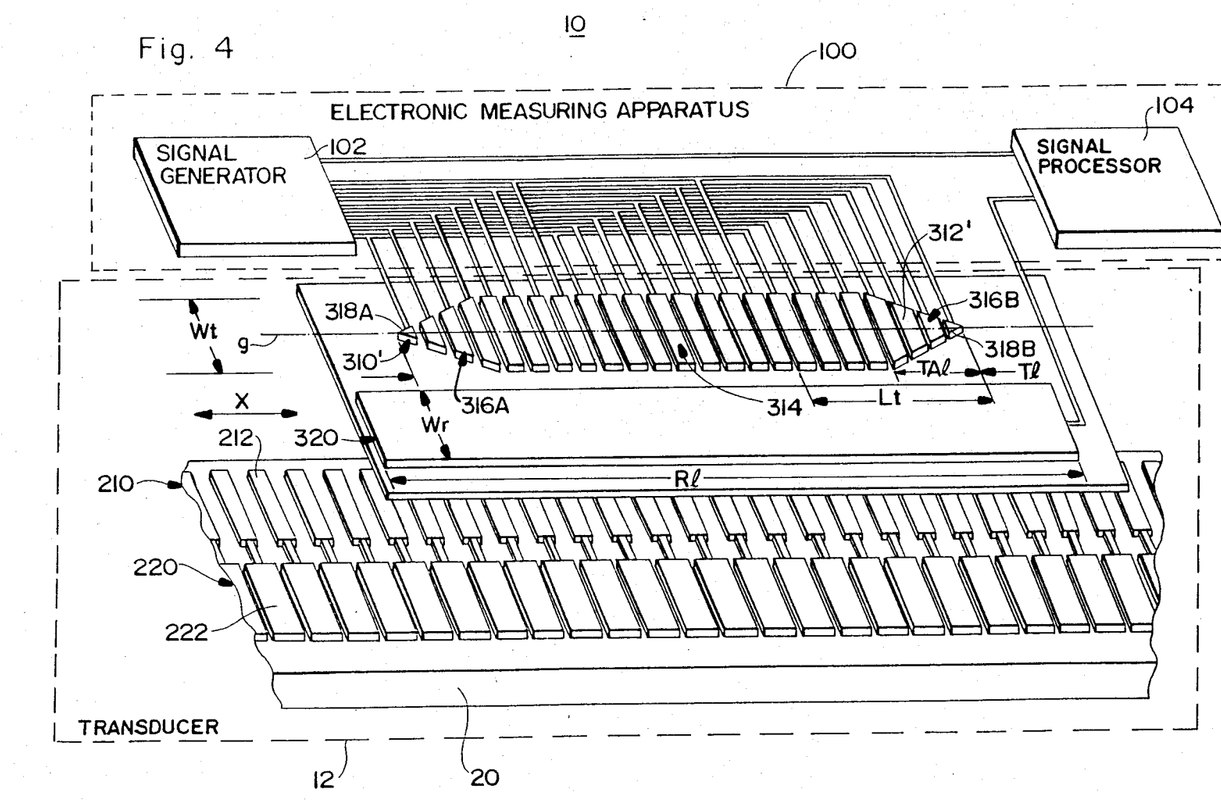
FIG. 4 is a diagrammatic view of a capacitance-type measuring device including a second embodiment of a transducer incorporating a tapered electrode structure in accordance with the present invention.

The second embodiment shown in FIG. 4 incorporates an alternative configuration of the electrode geometries on support 30 in accordance with the present invention. In this embodiment, the detector electrode 320 has a rectangular configuration with a length R1. The envelope of the first transmitter electrode array 310', however, is configured to have a length T1 less than the length R1 of the detector electrode 320 and equal to an integer number of transmitter wavelengths Lt. In this embodiment, the first transmitter electrodes 312' form an envelope which is defined by an intermediate portion 314 and two terminating portions 316A and 316B similar in configuration to sections 322, 324A and 324B, respectively, in FIG. 3.

More particularly, envelope portion 314 is generally rectangular in shape and the two triangular portions 316A and 316B respectively extend from each end of portion 314 so that the envelope tapers linearly from the full width Wt of portion 314 to termination at each end 318A and 318B over a distance TA1. Envelope portions 316A and 316B advantageously have, as depicted, the shape of equilateral triangles which form symmetrically tapered electrode envelope portions with respect to the center axis g extending the length of the elongate array 310'. As was described in connection with FIG. 3, it is preferable that the length TA1 of the tapered portions 316A and 316B be equal to one transmitter wavelength. However, improvements by a factor of 10 in certain configurations of capacitance-type measuring devices have been obtained for lengths TA1 equal to one-half the transmitter wavelength as shown in the embodiment of FIG. 4.

Figure 5:
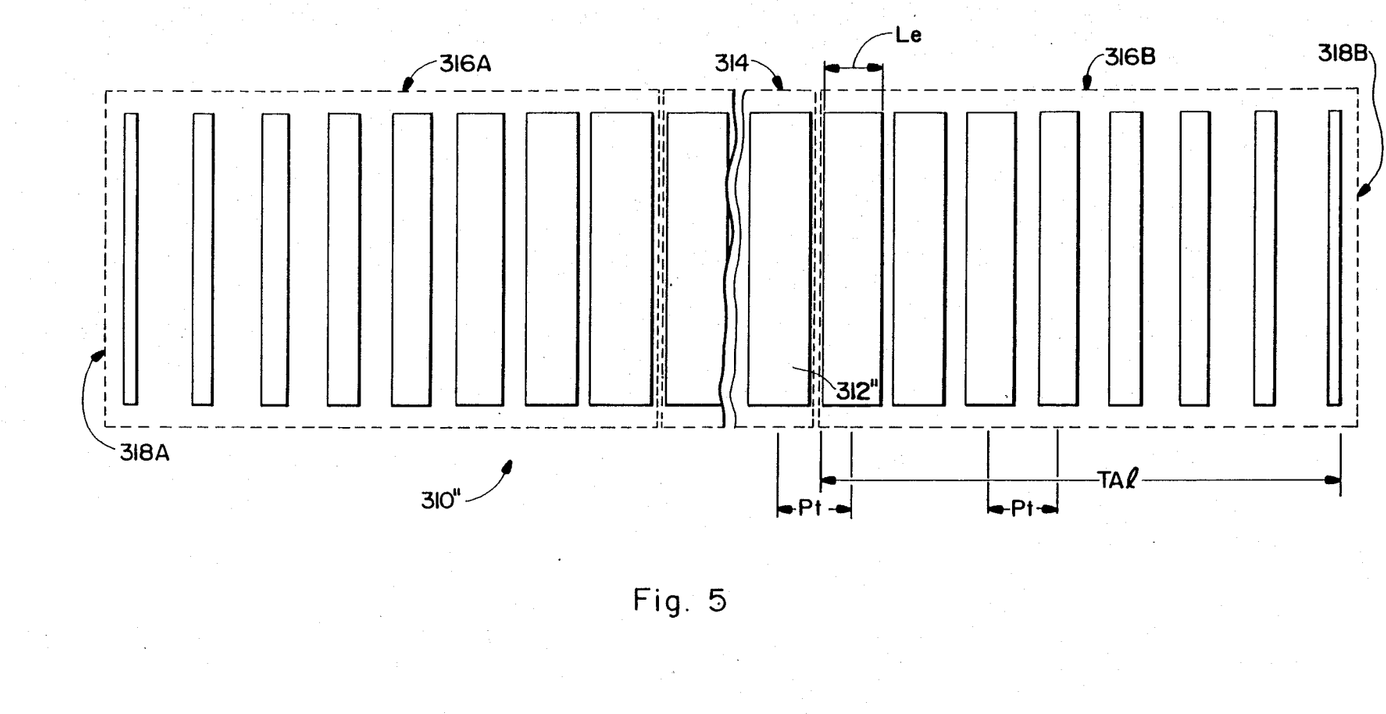
FIGS. 5–8 are plan views of alternative embodiments of tapered electrode structures according to the present invention.

As shown in FIG. 5, the end portions of an electrode structure in the form of an array of discrete electrodes, e.g., first transmitter electrode array 310, can also provide a linear coupling gradient, i.e., the aforementioned linear change in the degree of coupling between the first transmitter electrode array and the detector electrode, by progressively tapering the length, relative to the measurement axis X, of the individual electrodes 312" comprising the end portions 316A and 316B from the full length Le of portion 314 to termination at each of the respective ends 318A and 318B over the distance TA1. As shown, the tapered electrodes 312" of end portions 316A and 316B have the same pitch Pt (measured between the center lines of adjacent electrodes) as the uniform length electrodes of intermediate portion 314. Preferably, the tapered electrodes are each tapered symmetrically with respect to the electrode center line, that is each successive tapered electrode is reduced in length equally on both sides of the electrode centerline.

Although the present invention has been described with respect to embodiments having linear tapering geometries, it will be appreciated that if the individual electrodes of one of the electrode arrays comprising transducer 12, e.g. first transmitter electrodes 312/312′/312″ or first receiver electrodes 212, have non-rectangular shapes, e.g., triangular or sinusoidal as shown applicant's aforementioned copending application Ser. No. 07/200,368 incorporated herein by reference, then a non-linear tapering geometry will be required to achieve the linear coupling gradient between the first transmitter electrode array and detector electrode over the end portions of the electrode array/electrode provided with the tapered geometry.

Further, although the preferred embodiments have been described above with respect to electrode structures having symmetrical tapering geometries with lengths of taper equal to one transmitter wavelength, various degrees of improvement may still be obtained with other taper geometries. By way of example, as specifically described above, improvements in accuracy for tilt movements can be obtained with taper lengths equal to one-half the transmitter wavelength in certain capacitive sensor configurations. Further, computer modelling indicates that taper lengths equal to any number of integer transmitting wavelengths will give about the same improvement in resultant error caused by tilt as tapering over one transmitter wavelength.

Figure 6:
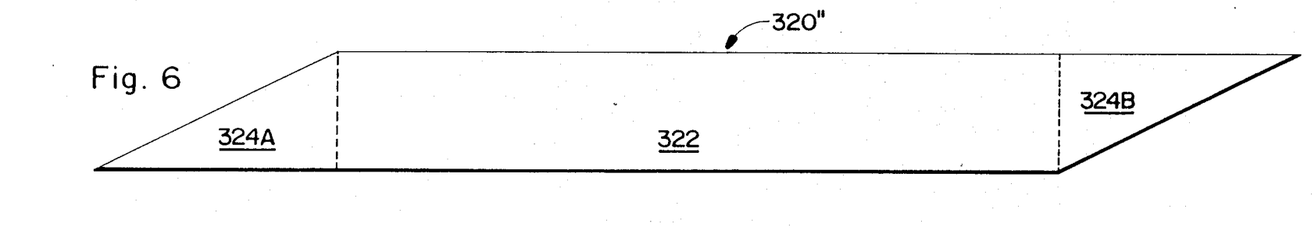
Figure 7:
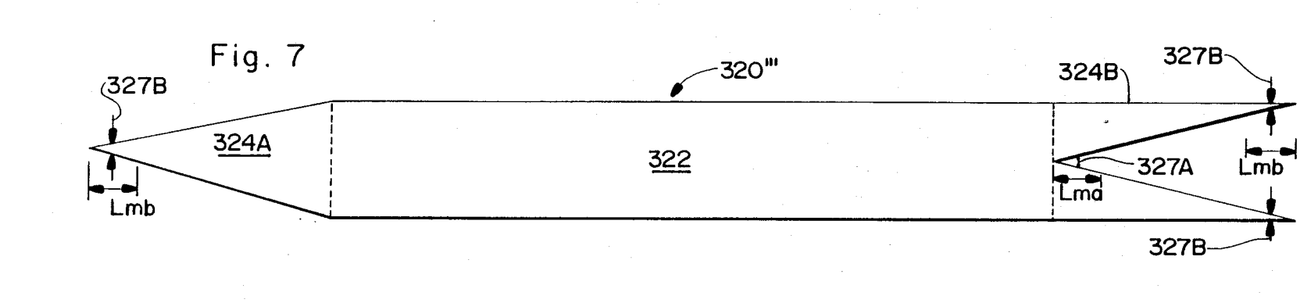
Figure 8:
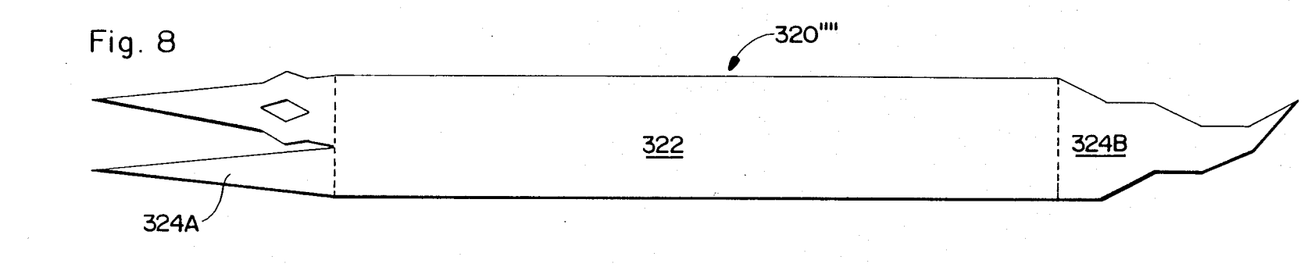

Still further, the use of tapered portions of other than symmetrical configuration are contemplated by the invention. For example, the taper configuration of the second receiver electrode arrays 320A and 320B shown in FIG. 2A of applicant's copending application Ser. No. 07/200,368 incorporated herein by reference provides significant improvement over the non-tapered geometry shown in FIG. 1 herein. Indeed, if capacitive edge effects are not a factor, as long as the effective width of the detector electrode or transmitter electrode envelope as a function of the X-coordinate (measurement direction) provides the above described linear coupling gradient, the geometric shape can vary almost in any way within the tapered portions of the electrode/envelope. Three exemplary alternative embodiments of detector electrode 320′ having non-symmetrical and irregularly shaped end portions 324A and 324B, which are equivalent to the symmetrical triangular tapering of electrode 320′ shown in FIG. 3, are shown in FIGS. 6–8, respectively. Preferably, as shown, end portions 324A and 324B have complementary configurations, that is, the combined per phase effect of the two end portions on multiple phase signals transmitted through transducer 12 (between the first transmitter electrode array 310 and detector electrode 320 through the first receiver electrode array 210 and second transmitter electrode array 220) when there is no tilt between support members 20 and 30 is substantially the same as would be provided by rectangular end portions of the same length.

Capacitive edge effects need not be considered if the regions of the tapered portions which have width dimensions approaching the nominal dimension of the spacing or gap between support members 20 and 30 constitute a relatively small percentage of the tapered portions over one transmitter wavelength Lt. More specifically, referring to electrode 320 of FIG. 7 as an example, the lengths Lma, Lmb of regions 327A and 327B of electrode end portions 324A and 324B, which have respective widths Wma, Wmb approaching the size of the gap between support members 20 and 30, preferably should each be less than approximately 5% of the distance Lt.

Further, in the case of the embodiments shown in FIGS. 3 and 4, wherein the cooperating electrodes 222 and 212, respectively, on support member 20 are rectangular in shape, the tapered portions of detector electrode 320′ or the envelope of the first transmitter electrode array 310′ can have any location in the direction of the Y-axis (i.e., can be skewed) within the envelope of the cooperating electrodes, as long as their effective widths as a function of the X-coordinate provide the linear coupling gradient as described above.

While significant improvements may be obtained using the preferred embodiments, other forms of tapered geometries could be used dependent upon the degree of improvement desired or achievable with any given configuration. Accordingly, the teachings of the inventions can be used to provide improvements for a variety of capacitance-type transducers by modifying one of the electrode configurations on support 30 to have a tapered geometry For example, in the type of capacitive encoders where each support member contains only one array of electrodes, the present invention is applicable with the same effect on sensitivity to tilt. In this case, as is shown in FIG. 4, the tapering preferably is done on the envelope of the electrodes on the shorter of the two support members, whether they are the transmitter or the receiver electrodes.

As can be seen from the above description, the use of the linear coupling gradient configuration of the present invention in a capacitance-type measuring device provides an output of improved accuracy for variations in the tilt of the support members 20 and 30 with respect to one another. The linear coupling gradient may be easily implemented by modifying the configuration of either the length or width of individual electrodes in an elongate electrode array, or modifying the width of an elongate unitary electrode structure. In either case, the configuration provides an inexpensive improvement of the measurement accuracy which allows the manufacture of the mechanical elements forming the capacitance-type measuring device to less stringent tolerances. This reduces the overall cost and allows the measuring device to be used in applications that would otherwise be prohibited by high cost or complexity.

It will be appreciated that many variations and modifications are possible in light of the above teachings. It is therefore to be understood that the invention may be practiced otherwise than as specifically described.

What is claimed is:

1. A transducer comprising:
    first and second support members, said support members being relatively displaceable with respect to each other, and at least one of said support members being displaceable relative to a measurement axis;
    first electrode means disposed on said first support member, and second electrode means disposed on said second support member and capacitively coupled to said first electrode means;
    said first and second electrode means each having an elongate configuration extending in the direction of the measurement axis, and one of said first and second electrode means having two end portions configured such that the degree of coupling between said first and second electrode means decreases linearly relative to the measurement axis along the extent of each end portion, and such that the respective directions of the decrease in the degree of coupling for said two end members are opposite to each other, so that the effect of tilt between said first and second support members on a set of signals transferred between said first and second electrodes is reduced.

2. The reducer of claim 1 wherein said one of said first and second electrode means comprises three portions: a first rectangularly-shaped portion; and second and third end portions extending from opposite ends of said rectangular portion and constituting said two end portions; said second and third end portions having complementary configurations such that the combined per phase effect of said second and third end portions on multiple phase signals transmitted between said first and second electrode means when there is no tilt between said first and second support members is substantially the same as would be provided by rectangularly-shaped end portions of the same length.

3. The transducer of claim 2 wherein said second and third end portions each have a triangular shape which is symmetrical with respect to a center line of said one of said first and second electrode means.

4. The transducer of claim 1 wherein said first electrode means has a shorter length in the measurement axis direction than said second electrode means and said first electrode means constitutes said one of said first and second electrode means.

5. The transducer of claim 1 wherein said first and second electrode means respectively comprise arrays of discrete first and second electrodes and said first electrodes are arranged in a periodic fashion so as to constitute successive groups of N adjacent electrodes, where N is an integer number greater than one, and said groups each have a wavelength Lt; and said two end portions each has a length in the measurement axis direction substantially equal to an integer number of wavelengths Lt.

6. The transducer of claim 5 wherein said first electrode means has a shorter length in the measurement axis than direction said second electrode means and said first electrode means constitutes said one of said first and second electrode means.

7. The transducer of claim 6 wherein the length of said first electrode means is substantially equal to an integer number of wavelengths Lt.

8. The transducer of claim 1 wherein said first and second electrode means respectively comprise arrays of discrete electrodes, each of said electrodes has a length and a width relative to the measurement axis; and the lengths and/or widths of the electrodes comprising said two end portions progressively taper in size so as to obtain said linearly decreasing degree of coupling.

9. The transducer of claim 8 wherein said electrodes have a rectangular shape and said progressive taper is linear.

10. The transducer of claim 8 wherein said first electrode means:
constitutes said one of said first and second electrode means;
has a shorter length relative to the measurement axis than said second electrode means; and
comprises three portions: a first rectangularly-shaped portion, and second and third end portions extending from opposite ends of said rectangularly-shaped portion and constituting said two end portions.

11. Transducer of claim 10 wherein the electrodes of said first electrode means are arranged in a periodic fashion so as to constitute successive groups of N adjacent electrodes, where N is an integer number greater than one, and said groups each have a wavelength Lt; the length of said first electrode means is substantially equal to a first integer number of wavelengths Lt; and said second and third end portions have a length substantially equal to a second integer number of wavelengths Lt, said second integer number being less than said first integer number.

12. A transducer comprising;
first and second support members, said support members being relatively displaceable with respect to each other, and at least one of said support members being displaceable relative to a measurement axis;
first electrode means and second electrode means disposed on said first support member;
third electrode means disposed on said second support means and capacitively coupling said first and second electrode means for transmission of signals between said first and second electrode means through said third electrode means; and
said first and second electrode means each having an elongate configuration extending in the direction of the measurement axis, and one of said first electrode and said second electrode means having two end portions configured such that the degree of coupling between said first and second electrode means, through said third electrode means, decreases linearly along the extent of each end portion relative to the measurement axis and such that the respective directions of the decrease in the degree of coupling for said two end portions are opposite to each other, so that the effect of tilt between said first and second support members on a set of signals transferred between said first and second electrode means, through said third electrode means, is reduced.

13. The transducer of claim 12 wherein said one of said first and second electrode means comprises three portions: a first rectangularly-shaped portion; and second and third end portions extending from opposite ends of said rectangularly-shaped portion and constituting said two end portions, said second and third end portions having complementary configurations such that the combined per phase effect of said second and third end portions on multiple phase signals transmitted between said first and second electrode means through said third electrode means when there is no tilt between said first and second support members is substantially the same as would be provided by rectangularly-shaped end portions of the same length.

14. The transducer of claim 13 wherein said first electrode means comprises an array of discrete first electrodes arranged in a periodic fashion so as to constitute successive groups of N adjacent electrodes, where N is an integer number greater than one, and said groups each have a wavelength Lt; and said second electrode means includes said second and third end portions and has a length in the measurement axis direction less than the length of said first electrode means and substantially equal to an integer number of wavelengths Lt.

15. The transducer of claim 14 wherein said second and third, end portions each have a length in the measurement axis direction substantially equal to an integer number of wavelengths Lt.

16. The transducer of claim 14 wherein said second and third end portions each have an effective width which progressively tapers relative to the measurement axis so as to obtain said linearly decreasing degree of coupling.

17. The transducer of claim 16 wherein the taper of the respective effective widths is linear.

18. The transducer of claim 17 wherein said second and third end portions each have a triangular shape which is symmetrical with respect to a center line of said second electrode means.

19. The transducer of claim 13 wherein said first electrode means:
   comprises an array of discrete first electrodes arranged in a periodic fashion so as to constitute successive groups of N adjacent electrodes, where N is an integer number greater than one, and said groups each have a wavelength Lt;
   constitutes said one of said first and second electrode means comprising three portions; and
   has a length in the measurement axis direction less than the length of said second electrode means and substantially equal to an integer number of wavelengths Lt.

20. The transducer of claim 19 wherein said second and third end portions each have a length in the measurement axis direction substantially equal to an integer number of wavelengths.

21. The transducer of claim 20 wherein said second electrode means has a rectangular shape.

22. The transducer of claim 21 wherein said first electrodes of said first electrode means each have a length and a width relative to the measurement axis; and the lengths and/or the widths of the first electrodes of said second and third end portions progressively taper in size so as to obtain said linearly decreasing degree of coupling.

23. The transducer of claim 22 wherein said third electrode means comprises an array of discrete third electrodes; said third electrodes have a uniform rectangular shape; and said progressive taper is linear.

24. A transducer comprising:
   first and second support members which are relatively displaceable with respect to each other, and at least one of which is displaceable relative to a measurement axis;
   an array of first transmitter electrodes disposed on the first support member in alignment with the measurement axis;
   an array of first receiver electrodes disposed on the second support member in alignment with the measurement axis and such that different portions of the first receiver electrode array are capacitively coupled with the first transmitter electrode array in dependence on the relative positions of said support members;
   an array of second transmitter electrodes disposed on the second support member in relative alignment with the first receiver electrode array and each of the second transmitter electrodes being electrically connected to a corresponding one of said first receiver electrodes; and
   detector electrode means disposed on the first support member in relative alignment with the first transmitter electrode array and capacitively coupled with the second transmitter electrode array in dependence on the relative position of said support members, one of said first transmitter electrode array and said detector electrode means being configured to have two end portions configured such that the degree of coupling between said first transmitter electrode array and said detector electrode means through said first receiver and second transmitter electrode arrays decreases linearly along the extent of each end portion relative to the measurement axis and such that the respective directions of the decrease in the degree of coupling for said two end members are opposite to each other, so that the effect of tilt between said first and second support members on a set of signals transferred between said first transmitter electrode array and said detector electrode means is reduced.

25. The transducer of claim 24 wherein a predetermined number of said first transmitter electrodes defines a transmitter wavelength and said first transmitter electrode array forms an envelope having a first rectangular portion and second and third end portions extending from opposite ends of said rectangular portion, said envelope having a length in the measurement axis direction less than the length of said detector electrode means and substantially equal to an integer number of transmitter wavelengths.

26. The transducer of claim 25 wherein said detector electrode means has a rectangular configuration and each of said second and third end portions of said envelope extends over a distance in the measurement axis direction substantially equal to an integer number of transmitter wavelengths.

27. The transducer of claim 26 wherein said first transmitter electrodes each have a length and a width relative to the measurement axis; and the lengths and/or the widths of the first transmitter electrodes of said second and third end portions progressively taper in size so as to obtain said linearly decreasing degree of coupling.

28. The transducer of claim 27 wherein said first receiver electrodes have a uniform rectangular shape; and said progressive taper is linear.

29. The transducer of claim 28 wherein only the lengths of the first transmitter electrodes of said second and third end portions progressively taper; and said second and third end portions each have a triangular shape which is symmetrical with respect to a center line of said first transmitter electrode array.

30. The transducer of claim 24 wherein a predetermined number of said first transmitter electrodes defines a transmitter wavelength and said detector electrode means has an elongate configuration including a first rectangular portion and second and third end portions extending from opposite ends of said rectangular portion and each having an effective width relative to the measurement axis which tapers so as to obtain said linearly decreasing degree of coupling; said detector electrode means having a length in the measurement axis direction less than said first transmitter electrode array and substantially equal to an integer number of transmitter wavelengths.

31. A transducer comprising:
   first and second support members disposed in opposed, spaced relation and movable relative to one another along an axis of measurement;
   first electrode array means disposed on said first support member along said measurement axis, said first electrode array means forming a rectangular envelope configuration having a predetermined length in the measurement axis direction;
   second electrode array means disposed on said second support member along said measurement axis such that different portions of said second electrode array means are capacitively coupled to said first electrode array means in response to relative movement of said first and second support members; and third electrode means disposed on said first support member along said measurement axis such that said third electrode means is capacitively coupled to different portions of said second electrode array means in response to relative movement of said first and second support members; said third electrode means having an elongate configuration with a length in the measurement axis direction less than the predetermined length of said first electrode array means envelope, and including a first rectangular portion and second and third end portions extending from opposite ends of said rectangular portion along said measurement axis and each having an effective width which progressively tapers along said measurement axis such that the degree of coupling between said first electrode array means and said third electrode means through said second electrode array means decreases linearly over said second and third end portions.

32. The transducer of claim 31 wherein said second and third tapered end portions each has a symmetrical triangular shape.

33. The transducer of claim 32 wherein said first electrode array means comprises first electrodes spaced from one another along the measurement axis such that successive groups of first electrodes are formed by equal numbers of adjacent first transmitter electrodes, said groups each having a wavelength Lt; and the length of said third electrode means in the measurement axis direction less than the predetermined length of said first electrode array means envelope and substantially equal to an integer number of wavelengths Lt.

34. The transducer of claim 33 wherein each of said second and third tapered end portions has a length in the measurement axis direction substantially equal to an integer number of wavelengths Lt.

35. The transducer of claim 33 wherein each of said tapered end portions has a length in the measurement axis direction substantially equal to one-half said wavelength.

36. A transducer comprising:

first and second support members disposed in opposed, spaced relation and movable relative to one another along an axis of measurement;

first electrode array means disposed on said first support member along said measurement axis, said first electrode array means forming an envelope having an elongate configuration of predetermined length in the measurement axis direction and including a first rectangular portion and second and third end portions extending from opposite ends of said rectangular portion along said measurement axis;

second electrode array means disposed on said second support member along said measurement axis such that different portions of said second electrode array means are capacitively coupled to said first electrode array means in response to relative movement of said first and second support members; and third electrode means disposed on said first support member along said measurement axis such that said third electrode means is capacitively coupled to different portions of said second electrode array means in response to relative movement of said first and second support members; said third electrode means having a rectangular configuration and said second and third end portions of said first electrode array means each being configured such that the degree of coupling between said first electrode array means and said third electrode means through said second electrode array means decreases linearly over said second and third end portions, and such that the respective directions of the decrease in the degree of coupling for said second and third end portions are opposite to each other, so that the effect of tilt between said first and third support members on a set of signals transferred between said first and third electrode means, through said second electrode means, is reduced.

37. The transducer of claim 36 wherein said second and third end portions each has a symmetrical triangular shape.

38. The transducer of claim 37 wherein said first electrode array means comprises first electrodes spaced from one another along the measurement axis such that successive groups of first electrodes are formed by equal numbers of adjacent first electrodes, said groups each having a wavelength Lt, the length of said first electrode array means envelope in the measurement axis direction being less than the length of said third electrode means and substantially equal to an integer number of wavelengths Lt.

39. The transducer of claim 38 wherein each of said second and third end portions has a length in the measurement axis direction substantially equal to an integer number of wavelengths Lt.

40. The transducer of claim 38 wherein each of said second and third end portions has a length in the measurement axis direction substantially equal to one-half said wavelength Lt.

* * * * *